United States Patent [19]
Zitkus

[11] 3,750,050
[45] July 31, 1973

[54] LASER ASSEMBLY
[75] Inventor: Wayne J. Zitkus, Toledo, Ohio
[73] Assignee: Owens-Illinois, Inc., Toledo, Ohio
[22] Filed: Mar. 26, 1971
[21] Appl. No.: 128,552

[52] U.S. Cl. .......................... 331/94.5 D, 331/94.5
[51] Int. Cl. ............................................ H01s 3/00
[58] Field of Search .................................. 331/94.5

[56] References Cited
UNITED STATES PATENTS

| | | | |
|---|---|---|---|
| 3,628,172 | 12/1971 | Matovich | 331/94.5 |
| 3,482,183 | 12/1969 | Thorburn | 331/94.5 |
| 3,493,888 | 2/1970 | Jackson | 331/94.5 |

Primary Examiner—Edward S. Bauer
Attorney—Richard D. Heberling et al.

[57] ABSTRACT

A plurality of disks include solid laserable material and are in parallel spaced apart relation within a transparent tubular enclosure. Spaces between the disks constitute portions of a collant fluid passage within the tubular enclosure.

Transparent end members at the opposite ends of the tubular enclosure are located in the path of radiant energy emitted by the laserable material. Coolant fluid passes radially through an exterior sleeve which encircles the end of the tubular enclosure. Sealing means are located between the exterior sleeve and the outside surface of the tubular enclosure. Adjustment means on the exterior sleeve urge a second sealing means against an axially outwardly facing surface of each transparent end member.

The inner end portion of each transparent end member confronts the laserable material and has radial dimensions less than the corresponding internal dimensions of the tubular enclosure. A spacer sleeve is telescopically fitted over the inner end portion and extends axially therebeyond to provide a coolant passage space between the inner end portion and the laserable material. The coolant passage also includes a portion formed by an axially-extending radially-relieved portion of the transparent end member which extends along the transparent end member and inside the spacer sleeve. The outer portion of the transparent member includes a plug portion which conforms to the inside dimensions of the tubular enclosure to reduce the risk of coolant fluid leakage.

9 Claims, 4 Drawing Figures

PATENTED JUL 31 1973  3,750,050

LASER ASSEMBLY

This invention relates to a laser assembly which has an improved end structure for the purpose of introducing and withdrawing a coolant fluid.

Others working in the laser field have recognized that it is desirable in certain types of lasers to provide for the passage of a coolant fluid into heat-transmitting relationship with the laserable material in order to prevent excessive temperatures in the laser assembly. This earlier work has in some instances involved modification of the transparent end member, often called a "readout prism," which lies in the path of radiant energy emitted by the laserable material. One approach has been to provide a radially-relieved portion which extends for the total length of the readout prism with no structure being provided in the readout prism assembly for maintaining a spacing for a coolant passage between the readout prism and the laserable material. Another approach to this problem has involved a readout prism which is frictionally retained on the tubular enclosure by a compressed sealing element which engages the interior wall of the tubular enclosure. This previous structure has also included a spacer sleeve which is telescoped over a reduced diameter inner end portion of the readout prism, with axial coolant passages being provided on the exterior surface of the spacer sleeve. A modification of this latter device has involved attachment of the retaining members for the readout prism to the cavity or housing which encloses a flash lamp and the laserable material. In either instance, the machining of the spacer sleeve is difficult and it has displayed a tendency to crack when subjected to the high temperatures normally encountered in apparatus of this type.

The present invention involves improvements to the end structure for fluid-cooled laser assemblies.

One aspect of the invention involves the manner of connecting the transparent end member or "readout prism" to the tubular body which encloses the laserable material. An exterior sleeve encircles an end portion of the tubular enclosure and is provided with two different types of sealing means. One sealing means prevents coolant fluid leakage between the exterior sleeve and the external wall of the tubular body, and the second sealing means acts against an axially facing outer surface of the transparent member. Means on the exterior sleeve are provided for urging the second sealing means against the axially facing outer surface.

Another aspect of the invention pertains to the construction of the transparent end member itself, wherein it includes a plug portion which conforms to the inside dimensions of the tubular body. A radially relieved portion of the transparent end member is located inwardly of the plug portion to form a space within the tubular body to permit the passage of coolant fluid.

Another portion of the invention involves the relationship between the transparent end member and the spacer sleeve which is telescoped over the inner end portion of the transparent member to maintain the laserable material spaced from the transparent member. Specifically, this aspect of the invention involves a coolant passage which extends along the readout prism member and is located inside the spacer sleeve.

Still another feature of the invention involves the method of assembling the individual elements of a laser assembly by telescoping a spacer sleeve over a reduced end portion of a transparent end member, positioning a key which rotationally fixes the spacer sleeve to the transparent end member, and inserting these elements together into the tubular enclosure so as to confine the key radially within the tubular enclosure and axially between the spacer sleeve and the readout prism member.

Another phase of the invention pertains to structure wherein a spacer sleeve is telescoped over the inner end portion of a transparent end member. The transparent end member has a planar abutment surface which extends radially inwardly of the spacer sleeve to provide surface-to-surface abutment between the transparent end member and the spacer sleeve.

The features of the invention outlined above, either alone or in conjunction with each other, have been found to simplify the construction of laser assemblies, reduce the cost of their manufacture and provide reliable performance under normal operating conditions.

While the invention may take many forms, a preferred embodiment thereof is shown in the accompanying drawings wherein FIG. 1 is a diagrammatic showing of the general organization of a laser which embodies the present invention;

Figure 1:
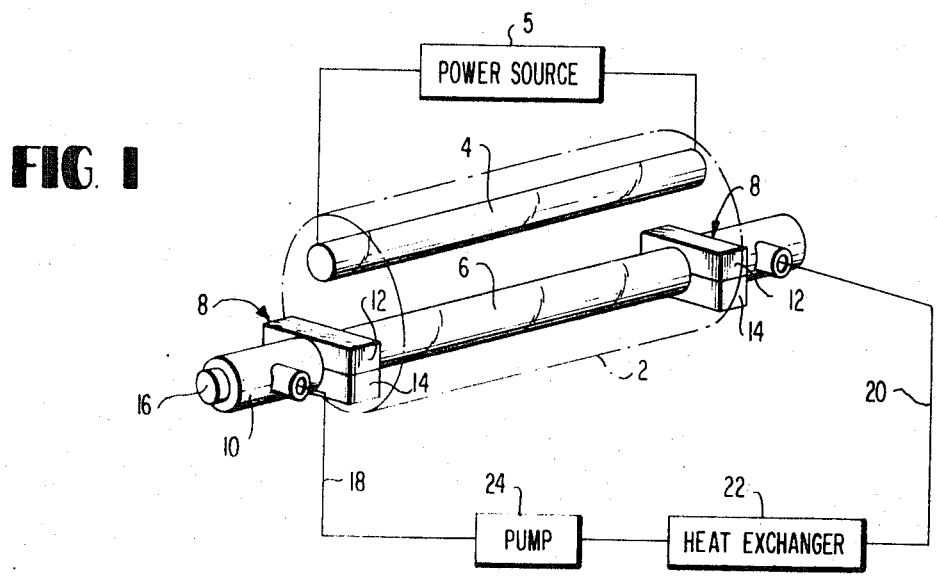

A typical laser construction is shown in diagrammatic form in FIG. 1 wherein an interiorly-reflective laser "cavity" or housing 2 encloses a flash tube 4 which furnishes the excitation energy and a transparent tubular enclosure 6 which encloses the laserable material.

At each end of the tubular enclosure 6, there is an end sealing assembly generally designated 8 which includes an exterior sleeve 10 which encircles the end portion of the tubular enclosure 6. Retaining means formed by a split ring assembly having upper elements 12 and lower elements 14 are bolted together and engage both the tubular enclosure 6 and the exterior sleeve 10 in a manner best shown in FIG. 3. Extending from the ends of the laser assembly is an end surface 16 of the transparent end member which transmits the laser-emitted radiant energy from the tubular enclosure 6.

A power source 5 energizes the flash lamp 4. A plurality of such linear flash lamps or a single helical flash lamp may alternatively be used. Since the walls of the tubular enclosure 6 are transparent and the laserable material is located therewithin, the energy emitted by the flash lamp 4 strikes the laserable material within the tubular enclosure 6 and creates the laser action in a manner well known in the art.

Fluid conduits 18 and 20 are attached to ports in the exterior sleeves 10 in order to provide a closed path for the coolant fluid. A circulating pump 24 moves the coolant fluid through conduit 18 into the exterior sleeve 10, and thence coolant fluid is passed through a conduit 20 to a heat exchanger 22. Coolant fluids are preferably liquid and may be water, heavy water, benzene, Freon or other suitable materials.

Figure 2:
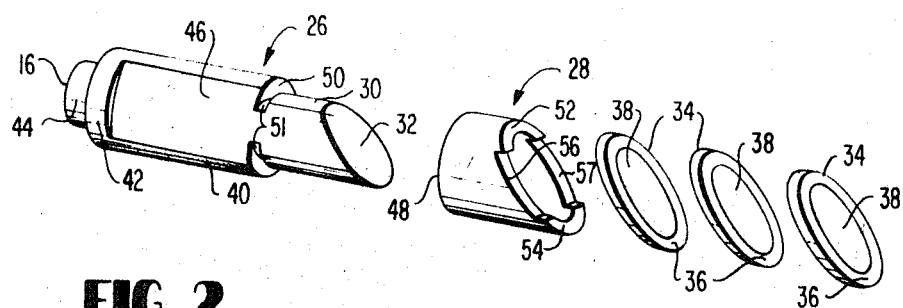
FIG. 2 is an exploded view showing the transparent readout prism member, spacer sleeve and representative disks which include the solid laserable material.

Referring to FIG. 2, it will be noted that the readout prism assembly includes an end member 26 and a spacer sleeve 28. The end member 26 includes an inner end portion 30 which has a reduced transverse cross section with respect to the inside diameter of the tubular enclosure 6. The inner end surface 32 of the member 26 confronts the disks 34, each of which includes a peripheral band of cladding glass 36 and a central portion 38 of laserable neodymium-doped ED-2 glass $Nd^{+3}$. The cladding glass may be ED-5 glass. Both types of glass are available from the assignee hereof. Energy emitted by the laserable material 38 will be directed through the transparent end member 26 and will be emitted through its end surface 16.

The transparent end member 26 has a medial portion 40 and an outer portion which includes both a plug portion 42 and a reduced end portion 44. The portions 30, 40, 42 and 44 are transversely circular during an intermediate stage of their manufacture. A cut is made in the member 26 so as to provide a radially relieved surface 46 which extends both along the medial portion 40 and the inner end portion 30. This surface 46 may be planar, but preferably it is arcuate, being generated about a line which lies parallel to the longitudinal axis of the end member 26.

The spacer sleeve 28 is a cylindrical tubular member with an inside diameter which is substantially the same as the outside diameter of the inner end portion 30 of end member 26. The outside diameters of the spacer sleeve 28 and plug portion 42 of the end member 26 are both substantially equal to the inside diameter of the tubular enclosure member 6. The outer end surface 48 of the spacer sleeve 28 abuts against a shoulder 50 on the transparent readout prism member 26. The inner surface of the spacer sleeve 28 is at an acute angle with respect to the central axis thereof and includes a pair of arcuate portions 52 and 54 which abut against the cladding material of the adjacent disk 34. The inner end surface of the spacer sleeve is axially relieved at 56 and 57 to maximize the area of the disk 34 which is contacted by the fluid coolant. It is preferable that the surfaces 32, 52 and 54 lie at Brewster's angle with respect to the central axis of the apparatus. However, other angles may be adopted and, if appropriate coolant materials are found, these surfaces may lie normal to the axis of the assembly.

The axial position of the spacer sleeve 28 on the transparent end member 26 is determined by the abutment of the outer end of the spacer sleeve against the shoulder 50 of the transparent end member 26. In order to ensure that there is a surface-to-surface abutment in this area, the surface 50 extends radially inwardly beyond the outer surface of the inner end portion 30 to form a peripheral groove 51. The same machining step which forms the surface 50 also creates the groove 51. The resulting structure avoids the presence of a fillet at the juncture of the shoulder 50 and the inner end portion 30 which would interfere with the desired abutting relationship.

Figures 3, 4:
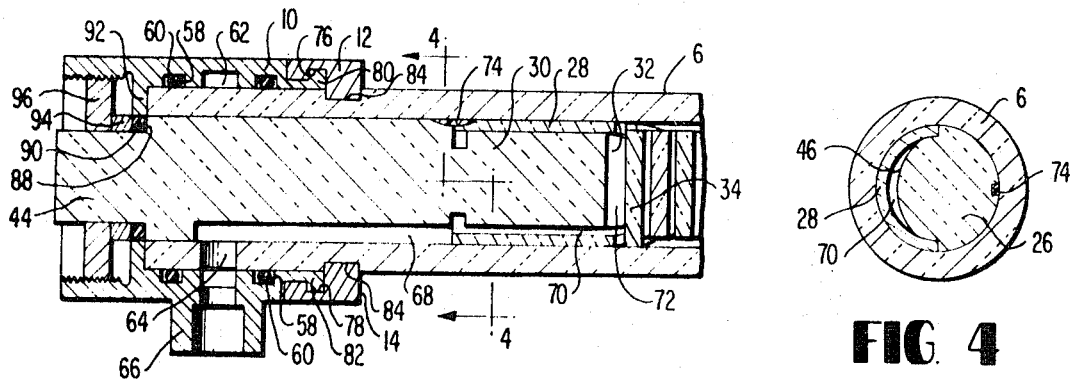
FIG. 3 is a sectional view through the apparatus to show the coolant passage.
FIG. 4 is a sectional view as seen along the line 4—4 in FIG. 3.

It is desirable to prevent relative rotation between the readout prism member 26 and the spacer sleeve 28. In the disclosed and preferred embodiment, such rotational movement is prevented by means of a solid polytetrafluoroethylene key 74 which, as shown in FIG. 3 is received in a keyway cut in the adjacent external surfaces of the spacer sleeve 28 and the medial portion 40 of the member 26. The keyway is simultaneously machined in both parts while they are held together by wax. The key is then placed in the keyway and the entire assembly is inserted into the tubular enclosure 6 to confine the key 74 radially within the tubular enclosure 6 and axially between the member 26 and the spacer sleeve 28.

The manner of attaching the readout prism assembly to the tubular enclosure body is best shown in FIG. 3 where it will be noted that the exterior sleeve 10 has a pair of internal circumferential grooves 58 which receive a pair of axially spaced resilient O-ring sealing elements 60. These elements 60 form a seal between the exterior sleeve 10 and the outer surface of the tubular enclosure 6. Located between the O-rings is another circumferential groove 62 which is in communication with an opening 64 in the wall of the tubular enclosure 6. A fitting 66 provides an opening which extends through the sleeve 10 between the sealing elements 60 to provide fluid communication to the coolant passages in the apparatus.

Coolant entering the apparatus through the fitting 66 will pass first through the internal groove portion 62 and then through an opening 64 in the wall of the tubular glass enclosure. The coolant then enters the axial passage 68 which exists by virtue of the radially relieved portion of the transparent end member 26. The coolant progresses then into the passage 70, which lies between the spacer sleeve 28 and the inner end portion 30 of the prism 26. As seen in FIG. 3, the spacer sleeve 28 extends inwardly beyond the surface 32 of the readout prism 26 so that there is a space 72 located between the member 26 and the first of the disks 34 which contain the laserable material. The construction of the disks 34 is such that a coolant fluid will pursue a serpentine or sinuous path as it progresses along the length of the laser assembly.

In the preferred embodiment shown in FIG. 3, the exterior sleeve 10 is held at a fixed axial position on the tubular enclosure 6 by the split ring retaining members 12 and 14 which have inwardly-facing grooves 76 and 78 which receive outwardly-directed projections 80 and 82 on the external sleeve. The retainers 12 and 14 are received in a external circumferential groove 84 cut into the tubular enclosure 6. In effect, the provision of the groove 84 creates a radial projection 86 which holds the sleeve 10 at a fixed axial position. Radial projections may alternatively be formed by external flange or flared tapered portions at the end of the tubular enclosure 6.

In addition to the seal provided by the O-rings 60 against the exterior surface of the tubular enclosure 6, there is a second sealing means associated with the external sleeve 10 which acts against an outwardly axially facing surface 88 of the transparent end member 26. This structure involves the O-ring seal 90 which is radially confined by the inwardly-directed flange portion 92 of the sleeve 10. On its interior side, the O-ring 90 lies against the cylindrical outer surface of the reduced end portion 44 of the end member 26. The inner side of the seal 90 contacts the surface 88, while its outer side is confronted by an axially-movable annular member 94.

In order to compress the sealing member 90, the sleeve 10 is provided with an adjustable means for urging the O-ring against the surface 88. This involves an exteriorly-threaded member 96 which is threadedly engaged with interior threads on the sleeve 10. The member 96 confronts the outer surface of the annular member 94 so that rotation of the member 96 moves member 94 inwardly to apply compressive forces against the O-ring 90 and all other elements within the tubular enclosure 6. It is possible to use an adjustable threaded connection between the exterior sleeve and a member attached to the tubular enclosure 6; or, tensioned members may be used to interconnect both of the exterior sleeves 10. The effective length of the tensioned members may be varied to provide the adjustment means on the sleeve for urging a seal against the outer end surface of the transparent end members.

In a typical laser assembly which utilized the principles of the invention, the tubular enclosure 6 had a overall length of about 22 inches, an outside diameter of about 1.25 inches and an inside diameter of about 0.877 inch. It was formed of non-laserable glass available from the assignee hereof under the designation ED-4. Its arcuate surfaces were made transparent by finish-polishing, and its end surfaces were provided with a fine ground (220 diamond) finish. The transparent end members were made of a non-laserable fine anneal ED-4 glass made by the assignee hereof. Their overall length was about 4 inches and their maximum outside diameter was about 0.874 inches. Each arcuate radially-relieved surface 46 had its center of curvature located about 0.25 inch from the longitudinal centerline of the transparent end member 26, and had a radius of curvature of 17/32 inch. The inner end surface was at an angle of 52° 39.5' to the longitudinal centerline of member 26. The spacer sleeve 28 was also made of ED-4 glass and had its inclined surfaces 52 and 54 lying at an angle of 48° 27.7' with respect to its longitudinal centerline.

The exterior sleeve assembly including members 10, 12 and 96 were formed of rhodium plated brass; whereas the annular gland member 94 is made of rhodium plated 303 stainless steel. The O-rings were resilient and made of silicone rubber and before being inserted in the apparatus had inside diameters less than those of the interiorly-confining members and outside diameters greater than those of the exteriorly-confining members.

Those skilled in the art will realize that the disclosed features of the invention are not limited only to glass lasers or spaced-disk lasers and may take many forms which differ in appearance from the disclosed preferred embodiments. The scope of the invention is not limited to the disclosed structure, but encompasses other methods and structures which adopt the principles outlined in the claims which follow.

I claim:

1. A laser assembly comprising,
an imperforate tubular body,
solid laserable body located within said tubular body,
said tubular body and said laserable body being constructed and arranged to form a coolant passage located interiorly of the tubular body in heat conducting relation to the laserable body whereby heat exchange fluid may remove heat from the laserable body,
a transparent member of solid material located within the tubular body at at least one end thereof in the path of radiant energy emitted by the laserable body, said transparent member having an inner end portion confronting the laserable body and an outer end portion which includes an outer surface transverse to the axis of said laser assembly,
an exterior sleeve encircling an end portion of the tubular body and having a means through which said heat exchange fluid communicates with said interiorly located coolant passage,
means to hold said exterior sleeve at a fixed axial position with respect to the tubular body,
first sealing means preventing fluid leakage between the exterior sleeve and the outside surface of the tubular body,
second sealing means being axially movable to sealingly engage the outer surface of the transparent member to said exterior sleeve, and
adjustment means on the exterior sleeve for urging the second sealing means axially against the outer surface of the transparent member to prevent the loss of coolant fluid from the tubular body.

2. The apparatus of claim 1 wherein the tubular body has an external radial projection, retaining means attached to said exterior sleeve and engaged against said projection for holding the exterior sleeve at a fixed axial position with respect to the tubular body.

3. The apparatus of claim 1 wherein the first sealing means includes a pair of axially spaced sealing elements, said tubular body having a first radial opening located between the sealing elements and in communication with the coolant passage, and a second opening extending through the exterior sleeve between the sealing elements to provide fluid communication to the coolant passage.

4. The apparatus of claim 3 wherein the tubular body has an external radial projection, retaining means attached to said exterior sleeve and engaged against said projection for holding the exterior sleeve at a fixed axial position with respect to the tubular body.

5. The apparatus of claim 3 wherein the transparent member is in close engagement with the inside surface of the tubular body, said transparent member being radially relieved along a side thereof to form a portion of the coolant passage which is aligned with said first opening.

6. The apparatus of claim 5 wherein the laserable body includes a plurality of parallel spaced disks, said inner end portion of the transparent member having a reduced transverse cross section, said radially relieved side of the transparent member extending axially along the inner end portion, and a spacer sleeve telescoped over the inner end portion and extending axially therebeyond to contact a first said disk to maintain a space which forms a portion of the coolant passage between the first disk and the inner end portion.

7. The apparatus of claim 6 wherein the disks form an acute angle with respect to the longitudinal axis of the tubular body.

8. The apparatus of claim 6 wherein the disks lie at Brewster's angle with respect to the longitudinal axis of the tubular body.

9. The apparatus of claim 8 wherein the inner end portion has an inner end surface which confronts the disks and is inclined with respect to the longitudinal axis of the tubular body at a different acute angle than said disks.

* * * * *